US012658476B2

(12) United States Patent
Cui et al.

(10) Patent No.: US 12,658,476 B2
(45) Date of Patent: *Jun. 16, 2026

(54) ELECTROCHEMICAL DEVICE AND ELECTRONIC DEVICE

(71) Applicant: DONGGUAN AMPEREX TECHNOLOGY LIMITED, Dongguan (CN)

(72) Inventors: Hui Cui, Dongguan (CN); Pengyang Feng, Dongguan (CN); Shuirong Zhang, Dongguan (CN); Jiali Dong, Dongguan (CN)

(73) Assignee: Dongguan Amperex Technology Limited, Dongguan (CN)

( * ) Notice: Subject to any disclaimer, the term of this patent is extended or adjusted under 35 U.S.C. 154(b) by 284 days.

This patent is subject to a terminal disclaimer.

(21) Appl. No.: 18/495,116

(22) Filed: Oct. 26, 2023

(65) Prior Publication Data

US 2024/0055664 A1 Feb. 15, 2024

Related U.S. Application Data

(63) Continuation of application No. 16/963,330, filed as application No. PCT/CN2019/127962 on Dec. 24, 2019, now Pat. No. 11,837,698.

(51) Int. Cl.

| | |
|---|---|
| *H01M 10/0567* | (2010.01) |
| *H01M 4/36* | (2006.01) |
| *H01M 4/62* | (2006.01) |
| *H01M 10/0525* | (2010.01) |
| *H01M 10/0569* | (2010.01) |
| *H01M 4/02* | (2006.01) |

(52) U.S. Cl.
CPC ....... *H01M 10/0567* (2013.01); *H01M 4/366* (2013.01); *H01M 4/624* (2013.01);
(Continued)

(58) Field of Classification Search
CPC ......... H01M 10/0525; H01M 10/0567; H01M 10/0569; H01M 2004/021;
(Continued)

(56) References Cited

U.S. PATENT DOCUMENTS

| | | |
|---|---|---|
| 2018/0190975 A1 | 7/2018 | Ishii et al. |
| 2018/0191027 A1 | 7/2018 | Ohara et al. |

FOREIGN PATENT DOCUMENTS

| | | |
|---|---|---|
| CN | 101030659 A | 9/2007 |
| CN | 102332604 A | 1/2012 |

(Continued)

OTHER PUBLICATIONS

Chinese Notification of Grant of in Patent Right and Search Report mailed Dec. 11, 2020 in counterpart application CN201911350641.9, 4 pages in Chinese.

(Continued)

*Primary Examiner* — Victoria H Lynch
(74) *Attorney, Agent, or Firm* — Maier & Maier, PLLC

(57) ABSTRACT

An electrochemical device, including a cathode, an anode and an electrolyte. The anode includes an anode current collector and an anode active material disposed on the anode current collector, the electrolyte includes fluoroethylene carbonate, and the electrochemical device meets the following relationship: $17.55 \leq K_1 - K_2 - 1.63K_3^2 + 11.27K_3 \leq 20.80$, where $K_1$ represents a specific surface area value of the unit mass of the anode active material (in $m^2/g$), and $1.0 \leq K_1 \leq 2.0$; $K_2$ represents a content value of the fluoroethylene carbonate required by per Ah capacity (in g/Ah), and $0.05 \leq K_2 \leq 0.25$; and $K_3$ represents a weight value of the anode active material required by per Ah capacity (in g/Ah).

20 Claims, 2 Drawing Sheets

(52) U.S. Cl.

CPC ... *H01M 10/0525* (2013.01); *H01M 10/0569* (2013.01); *H01M 2004/021* (2013.01); *H01M 2004/027* (2013.01); *H01M 2300/0025* (2013.01)

(58) Field of Classification Search

CPC ... H01M 2004/027; H01M 2300/0025; H01M 2300/0028; H01M 2300/0034; H01M 4/366; H01M 4/624; Y02E 60/10

See application file for complete search history.

(56) References Cited

FOREIGN PATENT DOCUMENTS

| CN | 102593510 | A | 7/2012 |
|----|-----------|---|--------|
| CN | 105990599 | A | 10/2016 |
| CN | 107749490 | A | 3/2018 |
| CN | 107851832 | A | 3/2018 |
| CN | 108807861 | A | 11/2018 |
| CN | 109478647 | A | 3/2019 |
| CN | 109687025 | A | 4/2019 |
| CN | 109841831 | A | 6/2019 |
| CN | 110391414 | A | 10/2019 |
| CN | 110600696 | A | 12/2019 |
| EP | 3011621 | A1 | 4/2016 |
| JP | 2015187926 | A | 10/2015 |
| WO | 2013069197 | A1 | 5/2013 |
| WO | 2019131195 | A1 | 7/2019 |

OTHER PUBLICATIONS

PCT International Search Report mailed Jul. 29, 2020, in PCT counterpart application PCT/CN2019/127962, 5 pages in Chinese.
Chinese First Office and Search Report mailed Oct. 10, 2020 in counterpart application CN201911350641.9, 6 pages and in Chinese.

ELECTROCHEMICAL DEVICE AND ELECTRONIC DEVICE

CROSS REFERENCE TO RELATED APPLICATIONS

The present application is a continuation application of U.S. patent application Ser. No. 16/963,330, entitled "ELECTROCHEMICAL DEVICE AND ELECTRONIC DEVICE," filed on 20 Jul. 2020, which is a National Stage application of PCT international application PCT/CN2019/127962, filed on 24 Dec. 2019, the disclosure of which is hereby incorporated by reference in its entirety.

BACKGROUND

1. Technical Field

The present application relates to the field of energy storage, and more particularly to an electrochemical device and an electronic device.

2. Description of the Related Art

Electrochemical devices, such as lithium-ion batteries are widely applied to fields of wearable devices, smart phones, unmanned aerial vehicles, or even electric vehicles, etc. due to their advantages such as high energy density, long cycle life and no memory effect, and have become novel green chemical power supplies with the greatest development potential in the world today. With the expansion of the application of lithium-ion batteries and the development of modern information technologies, people have more performance requirements for lithium-ion batteries, such as higher energy density and fast charging and discharging capability.

In view of this, it is necessary to optimize and improve the whole electrochemical device so that the electrochemical device can maintain excellent electrochemical performance while achieving fast charging and discharging.

SUMMARY

The present application seeks to solve at least one of the problems in the related art to at least to a certain extent by providing an electrochemical device and an electronic device.

According to one aspect of the present application, the present application provides an electrochemical device, including a cathode, an anode and an electrolyte, wherein:

the anode includes an anode current collector and an anode active material layer disposed on the anode current collector, and the anode active material layer includes an anode active material; and the electrolyte includes fluoroethylene carbonate (FEC), and, the electrochemical device meets the following relationship:

$$17.55 \leq K_1 - K_2 - 1.63K_3{}^2 + 11.27K_3 \leq 20.80,$$

where $K_1$ represents a specific surface area value of the unit mass of the anode active material (in $m^2/g$), and $1.0 \leq K_1 \leq 2.0$;

$K_2$ represents a content value of the fluoroethylene carbonate required by per Ah capacity (in g/Ah), and $0.015 \leq K_2 \leq 0.36$; and $K_3$ represents a weight value of the anode active material required by per Ah capacity (in g/Ah).

According to an embodiment of the present application, the anode active material includes first particles, the first particles are secondary particles, each secondary particle includes at least 2 primary particles, and the quantity of the secondary particles accounts for 50% to 90% of the total quantity of the particles of the anode active material.

According to an embodiment of the present application, Dv50 of the primary particles in the secondary particles is 2 μm to 10 μm, and Dv50 of the secondary particles is 5 μm to 20 μm.

According to an embodiment of the present application, the anode active material includes second particles, the second particles are primary particles, and Dv50 of the second particles is 3 μm to 10 μm.

According to an embodiment of the present application, Dv50 of the anode active material is 9 μm to 25 μm.

According to an embodiment of the present application, the anode active material layer has the porosity of 15% to 40%.

According to an embodiment of the present application, the anode further includes a conducting layer, and the conducting layer has a thickness of 0.5 μm to 1.5 μm.

According to an embodiment of the present application, the electrolyte further includes an organic solvent, and the organic solvent includes ethyl propionate (EP).

According to an embodiment of the present application, the ratio $W:K_1$ of the content value W of the ethyl propionate required by per Ah capacity (in g/Ah) to $K_1$ is 0.12 to 1.14.

According to an embodiment of the present application, the ratio $W:P$ of the content value W of the ethyl propionate required by per Ah capacity (in g/Ah) to the porosity value P of the anode active material layer (in percentage) is 0.6 to 6.3.

According to another aspect of the present application, the present application provides an electronic device, including the electrochemical device according to the present application.

Additional aspects and advantages of the present application will be described or shown in the following description or interpreted by implementing the embodiments of the present application.

DETAILED DESCRIPTION

Figure 1:
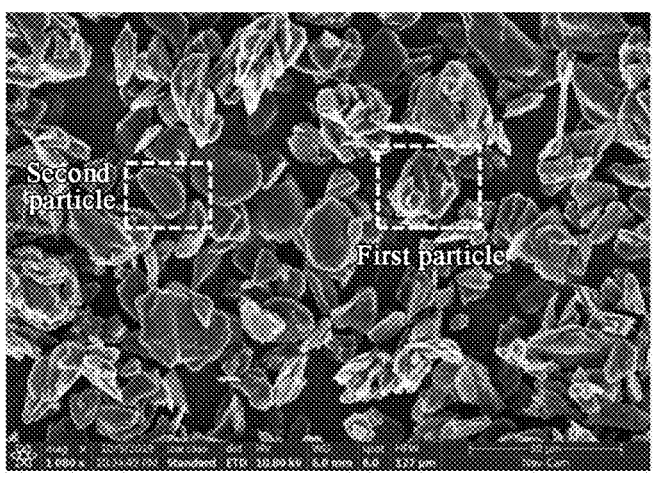
FIG. 1 shows a scanning electron microscope (SEM) morphological diagram of an anode active material in an electrochemical device of the present application.

The embodiments of the present application will be described in detail below. The embodiments of the present application should not be interpreted as limitations to the present application.

In the detailed description and the claims, a list of items connected by the term "at least one of" may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

The present application provides an electrochemical device, including a cathode, an anode and an electrolyte, wherein:

the anode includes an anode current collector and an anode active material layer disposed on the anode current collector, and the anode active material layer includes an anode active material;

the electrolyte includes fluoroethylene carbonate, and the electrochemical device meets the following relationship:

$$17.55 \leq K_1 - K_2 - 1.63K_3^2 + 11.27K_3 \leq 20.80,$$

where $K_1$ represents a specific surface area value of the unit mass of the anode active material (in $m^2/g$), and $1.0 \leq K_1 \leq 2.0$;

$K_2$ represents a content value of the fluoroethylene carbonate required by per Ah capacity (in g/Ah), and $0.015 \leq K_2 \leq 0.36$; and $K_3$ represents a weight value of the anode active material required by per Ah capacity (in g/Ah).

In the electrochemical device of the present application, the FEC easily forms a film on the anode. The relationship between the FEC and the specific surface area of the anode active material can be determined according to the above equation, which is beneficial for facilitating the better formation of a solid electrolyte interface (SEI) film, improving the stability of the SEI film in a later period of cycle, reducing the formation of side reaction products, and finally improving the cycle performance of the electrochemical device. Additionally, optimizing the relationship between the ingredients (i.e., FEC) of the electrolyte and the anode active material is beneficial for improving the electrolyte infiltration of the anode active material at a high compacted density (such as the compacted density of 1.78 $g/cm^3$ or above) so as to improve the kinetic performance of the electrochemical device, such as direct current resistance and charge transfer resistance.

On the basis of the above embodiments, an anode, an electrolyte, a cathode, a separator, an electrochemical device, and an electronic device applicable to the present application are illustrated in detail below.

Anode

The particle size and the specific surface area of the anode active material (e.g., graphite) may affect intercalation and deintercalation paths of lithium ions, thereby affecting the kinetic performance of a lithium-ion battery. By using a small-particle-size anode active material with excellent isotropy, under the condition of keeping the total specific surface area unchanged, a specific surface area of the base surface can be reduced as much as possible and the specific surface area of an end surface can be increased. The end surface is a surface in a direction Lc, the base surface is a surface in a direction La, La is the average size of the anode active material in an axis-a direction, and Lc refers to the accumulation thickness of the anode active material layer in an axis-c direction perpendicular to the anode active material layer. Due to the increase of the specific surface area of the end surface, lithium ions can directly enter an anode active material layer from an end surface defect position, which may achieve fast lithium ion migration, reduce the resistance of the lithium-ion battery, and improve the kinetic performance of the lithium-ion battery. In a cycle process, lithium ion deintercalation would easily cause expansion in the direction Lc, and the small-particle-size anode active material with excellent isotropy can inhibit interlayer expansion of the anode active material, thereby improving the cycle performance.

According to an embodiment of the present application, the anode active material includes first particles, the first particles are secondary particles. Each secondary particle includes at least 2 primary particles. In some embodiments, the secondary particle includes 3 to 10 primary particles. In some embodiments, the quantity of the secondary particles accounts for 50% to 95% of the total quantity of the particles of the anode active material. In some embodiments, the quantity of the secondary particles accounts for 60% to 90% of the total quantity of the particles of the anode active material.

According to an embodiment of the present application, Dv50 of the primary particles in the secondary particles is 2 μm to 10 μm, and Dv50 of the secondary particles is 5 μm to 20 μm. In some embodiments, Dv50 of the primary particles in the secondary particles is 3 μm, 4 μm, 5 μm, 6 μm, 7 μm, 8 μm or 9 μm. In some embodiments, Dv50 of the secondary particles is 8 μm to 18 μm. In some embodiments, Dv50 of the secondary particles is 10 μm to 15 μm.

According to an embodiment of the present application, the anode active material includes second particles, the second particles are primary particles, Dv50 of the second particles is 3 μm to 10 μm. In some embodiments, Dv50 of the second particles is 4 μm, 5 μm, 6 μm, 7 μm, 8 μm or 9 μm.

FIG. 1 shows a scanning electron microscope (SEM) morphological diagram of an anode active material in an electrochemical device of the present application. As shown in FIG. 1, the anode active material in the electrochemical device of the present application includes primary particles and secondary particles. Through a combination of the primary particles and the second particles, the anode active material may have a small particle size, a high end surface specific surface area and a low base surface specific surface area, which thus reduces the charging resistance of the lithium-ion battery.

According to an embodiment of the present application, Dv50 of the anode active material is 9 μm to 25 μm. In some embodiments, Dv50 of the anode active material is 10 μm to 20 μm. In some embodiments, Dv50 of the anode active material is 12 μm to 15 μm.

According to an embodiment of the present application, the weight ratio of the second particles to the first particles is 1:9 to 1:1. In some embodiments, the weight ratio of the second particles to the first particles is 1:8, 1:7, 1:6, 1:5, 1:4, 1:3 or 1:2.

According to an embodiment of the present application, the anode active material has a porosity of 15% to 40%. In some embodiments, the anode active material has a porosity of 20% to 35%. In some embodiments, the anode active material has a porosity of 25% to 30%.

According to an embodiment of the present application, the anode active material has a multi-edge near spherical shape.

According to an embodiment of the present application, the anode active material has an OI value of 2.0 to 5.0. An X-ray diffraction spectrum of the anode active material includes a 004 diffracted ray pattern and a 110 diffracted ray pattern, the ratio C004/C110 of the axis-c length C004 of the unit cell length obtained by the 004 diffracted ray pattern to the axis-a length C110 of the unit cell length obtained by the 110 diffracted ray pattern is the OI value of the anode active material. In some embodiments, the anode material has the OI value of 3.0 to 4.0. If the OI value is within this range, the anode active material with superior performance and better matching performance with the electrolyte can be obtained.

According to an embodiment of the present application, the anode active material is at least one selected from natural graphite, artificial graphite, mesocarbon microbead (MCMB), hard carbon, soft carbon, silicon, silicon-carbon compounds, Li—Sn alloy, Li—Sn—O alloy, Sn, SnO, $SnO_2$, lithiated $TiO_2$-$Li_4TisO_{12}$ with a spinel structure and Li—Al alloy. Non-limiting examples of carbon materials include crystalline carbon, amorphous carbon, and a mixture thereof. The crystalline carbon may be amorphous or flake-shaped, platelet-shaped, spherical or fibrous natural graphite or artificial graphite. The amorphous carbon may be soft carbon, hard carbon, mesophase pitch carbide, calcined coke, etc.

According to an embodiment of the present application, the anode further includes a conducting layer, the conducting layer has a thickness of 0.5 μm to 1.5 μm. In some embodiments, the conducting layer has a thickness of 0.8 μm to 1.2 μm. In some embodiments, the conducting layer has a thickness of 1.0 μm. In some embodiments, a conducting material of the conducting layer may include any conducting material as long as it does not cause chemical change. Non-limiting examples of the conducting material include a carbon-based material (such as natural graphite, artificial graphite, carbon black, acetylene black, ketjen black, carbon fiber, carbon nanotubes and graphene), a metal-based material (such as metal powder and metal powder, including, for example, copper, nickel, aluminum, silver, etc.), a conducting polymer (such as a polyphenylene derivative) and a mixture thereof. In some embodiments, the conducting material of the conducting layer includes carbon nanotubes, and the diameter of the carbon nanotubes is 1 nm to 30 nm. In some embodiments, the diameter of the carbon nanotubes is 1 nm to 25 nm. In some embodiments, the diameter of the carbon nanotubes is 2 nm to 20 nm. In some embodiments, the conducting material of the conducting layer includes graphene, the graphene has 1 to 700 layers. In some embodiments, the graphene has 1 to 500 layers. In some embodiments, the graphene has 1 to 300 layers.

According to an embodiment of the present application, the anode further includes an adhesive. The adhesive is at least one selected from polyvinylidene fluoride, a vinylidene fluoride-hexafluoropropylene copolymer, polyamide, poly-acrylonitrile, polyacrylic ester, polyacrylic acid, polyacrylate, sodium carboxymethylcellulose, polyvinylpyrrolidone, polyvinyl ether, polymethyl methacrylate, polytetrafluoroethylene and polyhexafluoropropylene, styrene butadiene rubber and acrylic ester, and epoxy resin.

The anode current collector of the present application may be selected from a copper foil, a nickel foil, a stainless steel foil, a titanium foil, nickel foam, copper foam, a polymer substrate coated with a conducting metal, and combinations thereof.

Electrolyte

According to an embodiment of the present application, the electrolyte further includes an organic solvent, the organic solvent includes ethyl propionate.

According to an embodiment of the present application, the organic solvent further includes at least one of ethylene carbonate (EC), propylene carbonate (PC), butylene carbonate, dimethyl carbonate, ethyl methyl carbonate, diethyl carbonate (DEC), methyl n-propyl carbonate, ethyl n-propyl carbonate, di-n-propyl carbonate, di(fluoromethyl) carbonate, di(difluoromethyl) carbonate, di(trifluoromethyl) carbonate, bis(2-fluoroethyl) carbonate, bis(2,2-difluoroethyl)

carbonate, bis(2,2,2-trifluoroethyl) carbonate, methyl 2-fluoroethyl carbonate, methyl 2,2-difluoroethyl carbonate, methyl 2,2,2-trifluoroethyl carbonate, methyl acetate, ethyl acetate, propyl acetate, isopropyl acetate, butyl acetate, sec-butyl acetate, isobutyl acetate, tert-butyl acetate, methyl propionate, propyl propionate, isopropyl propionate, methyl butyrate, ethyl butyrate, propyl butyrate, methyl isobutyrate, ethyl isobutyrate, methyl valerate, ethyl valerate, methyl trifluoroacetate, ethyl trifluoroacetate, propyl trifluoroacetate, butyl trifluoroacetate, 2,2,2-trifluoroethyl trifluoroacetate, γ-butyrolactone or γ-valerolactone.

According to an embodiment of the present application, the content of the organic solvent is 70% to 95% of the total weight of the electrolyte.

According to an embodiment of the present application, the content of the ethyl propionate is 5% to 80% based on the total weight of the organic solvent.

According to an embodiment of the present application, the ratio W:$K_1$ of the content value W of the ethyl propionate required by per Ah capacity (in g/Ah) to $K_1$ is 0.12 to 1.14. In some embodiments, W:$K_1$ is 0.15 to 1.10. In some embodiments, W:$K_1$ is 0.3 to 1.0. In some embodiments, W:$K_1$ is 0.5 to 0.8.

According to an embodiment of the present application, the ratio W:P of the content value W of the ethyl propionate required by per Ah capacity (in g/Ah) to the porosity value P of the anode active material (in percentage) is 0.6 to 6.3. In some embodiments, W:P is 0.8 to 6.0. In some embodiments, W:P is 1.0 to 5.0. In some embodiments, W:P is 2.0 to 4.0. In some embodiments, W:P is 2.5 to 3.0.

According to an embodiment of the present application, the electrolyte includes a lithium salt. An electrolyte applicable to the electrolyte of the embodiment of the present application includes, but is not limited to an inorganic lithium salt, such as $LiClO_4$, $LiAsF_6$, $LiPF_6$, $LiBF_4$, $LiSbF_6$, $LiSO_3F$ and $LiN(FSO_2)_2$; a fluorine-containing organic lithium salt, such as $LiCF_3SO_3$, $LIN(FSO_2)(CF_3SO_2)$, $LiN(CF_3SO_2)_2$, $LiN(C_2F_5SO_2)_2$, cyclic lithium 1,3-hexafluoropropane disulfonimide, cyclic lithium 1,2-tetrafluorethane disulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$; and a dicarboxylic-complex-containing lithium salt, such as lithium bis(oxalato)borate, lithium difluoro(oxalato)borate, lithium tri(oxalato)phosphate, lithium difluorobis(oxalato)phosphate and lithium tetrafluoro(oxalato)phosphate. Additionally, one of the above electrolytes may be used alone, or two or more of them may be used at the same time. For example, in some embodiments, the electrolyte includes a combination of $LiPF_6$ and $LiBF_4$. In some embodiments, the electrolyte includes a combination of an inorganic lithium salt, such as $LiPF_6$ or $LiBF_4$, and a fluorine-containing organic lithium salt, such as $LiCF_3SO_3$, $LIN(CF_3SO_2)_2$ and $LiN(C_2F_5SO_2)_2$. In some embodiments, the concentration of the electrolyte is in a range of 0.8 to 3 mol/L, for example, in a range of 0.8 to 2.5 mol/L, in a range of 0.8 to 2 mol/L, in a range of 1 to 2 mol/L, and for another example, 1 mol/L, 1.15 mol/L, 1.2 mol/L, 1.5 mol/L, 2 mol/L or 2.5 mol/L.

According to an embodiment of the present application, the electrolyte further includes an additive. The additive is one or more selected from $LiBF_4$, ethylene sulfate (DTD), vinylene carbonate (VC), vinyl ethylene carbonate (VEC), succinonitrile (SN), adiponitrile (ADN), 1,3-propanesultone (PS) or lithium bis(oxalate)borate.

Cathode

In the electrochemical device according to the present application, the cathode includes a cathode current collector and a cathode active material disposed on the cathode current collector. The specific types of the cathode active material are not particularly limited, and may be selected according to requirements.

For example, in some embodiments, the cathode active material includes a compound for reversible intercalation and deintercalation of lithium ions. In some embodiments, the cathode active material may include a composite oxide, the composite oxide contains lithium and at least one element selected from cobalt, manganese and nickel. In still some embodiments, the cathode active material is one or more selected from lithium cobalt oxide ($LiCoO_2$), a lithium nickel manganese cobalt ternary material, lithium manganate ($LiMn_2O_4$), lithium nickel manganate ($LiNi_{0.5}Mn_{1.5}O_4$) and lithium iron phosphate ($LiFePO_4$).

In some embodiments, a cathode active material layer may be provided with a coating on the surface or may be mixed with another compound with a coating. The coating may include at least one coating element compound selected from an oxide of a coating element, a hydroxide of the coating element, an oxyhydroxide of the coating element, an oxycarbonate of the coating element and a hydroxycarbonate of the coating element. The compound for the coating may be amorphous or crystalline. The coating element contained in the coating may include Mg, Al, Co, K, Na, Ca, Si, Ti, V, Sn, Ge, Ga, B, As, Zr, F or a mixture thereof. The coating can be applied by any method as long as the method does not adversely affect the performance of the cathode active material. For example, the method may include any coating method known to those skilled in the art, such as spray coating and dipping.

In some embodiments, the cathode active material layer further includes a binder, and optionally includes a cathode conducting material.

The binder increases the binding of the cathode active material particles to each other and the binding of the cathode active material to the current collector. Non-limiting examples of the binder include polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resin, nylon, etc.

The cathode active material layer includes a cathode conducting material to impart conductivity to the electrode. The cathode conducting material may include any conducting material as long as it does not cause a chemical change. Non-limiting examples of the cathode conducting material include a carbon-based material (such as natural graphite, artificial graphite, carbon black, acetylene black, ketjen black and carbon fiber), a metal-based material (such as metal powder and a metal fiber, including, for example, copper, nickel, aluminum, silver, etc.), a conducting polymer (such as a polyphenylene derivative) and a mixture thereof.

The cathode current collector of the electrochemical device according to the present application may be aluminum (Al), but it is not limited thereto.

Separator

In some embodiments, a separator is disposed between the cathode and the anode to prevent short circuits. The material and the shape of the separator applicable to the embodiment of the present application are not particularly limited, and may be any of the techniques known in the state of the art. In some embodiments, the separator includes a polymer or an inorganic substance and the like formed by a material stable in the electrolyte of the present application.

For example, the separator may include a substrate layer and a surface treatment layer. The substrate layer is a nonwoven fabric, a film or a composite film with a porous structure, and the material of the substrate layer is at least one selected from polyethylene, polypropylene, polyethylene glycol terephthalate and polyimide. Specifically, a porous polypropylene film, a porous polyethylene film, a polypropylene nonwoven fabric, a polyethylene nonwoven fabric or a porous polypropylene-polyethylene-polypropylene composite film may be used.

The surface treatment layer is disposed on at least one surface of the substrate layer. The surface treatment layer may be a polymer layer or an inorganic matter layer, or may be a layer formed by mixing a polymer and an inorganic matter.

The inorganic matter layer includes inorganic particles and an adhesive. The inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate.

The adhesive is selected from one or a combination of several of polyvinylidene fluoride, a vinylidene fluoride-hexafluoropropylene copolymer, polyamide, polyacrylonitrile, polyacrylic ester, polyacrylic acid, polyacrylate, polyvinylpyrrolidone, polyvinyl ether, polymethyl methacrylate, polytetrafluoroethylene and polyhexafluoropropylene.

The polymer layer includes a polymer. The material of the polymer is at least one selected from polyamide, polyacrylonitrile, an acrylic ester polymer, polyacrylic acid, polyacrylate, polyvinylpyrrolidone, polyvinyl ether, polyvinylidene fluoride and poly(vinylidene fluoride-hexafluoropropylene).

Electrochemical Device

The electrochemical device of the present application includes any device where an electrochemical reaction takes place, and specific examples of the electrochemical device include all kinds of primary batteries, secondary batteries, fuel cells, solar cells, or capacitors. Particularly, the electrochemical device is a lithium secondary battery including a lithium metal secondary battery, a lithium ion secondary battery, a lithium polymer secondary battery or a lithium ion polymer secondary battery.

Electronic Device

The present application further provides an electronic device, including the electrochemical device according to the present application.

The use of the electrochemical device of the present application is not specifically limited, and the electrochemical device may be used for any electronic device known in the prior art. In some embodiments, the electrochemical device of the present application may be used for, but is not limited to, a notebook computer, a pen-based computer, a mobile computer, an e-book player, a portable phone, a portable fax machine, a portable copier, a portable printer, a head-mounted stereo headphone, a video recorder, an LCD TV, a portable cleaner, a portable CD player, a minidisc player, a transceiver, an electronic notebook, a calculator, a memory card, a portable recorder, a radio, a backup power supply, a motor, an automobile, a motorcycle, a motor bicycle, a bicycle, a lighting apparatus, a toy, a game console, a clock, an electric tool, a flash light, a camera, a household large storage battery, a lithium ion capacitor, etc.

Hereinafter, the lithium-ion battery is taken as an example, and the preparation of the lithium-ion battery is described in conjunction with a specific embodiment. Those skilled in the art would understand that the preparation method described in the present application is merely an example, and any other suitable preparation methods fall within the scope of the present application.

EXAMPLES

Examples of a lithium-ion battery according to the present application and comparative examples are illustrated hereafter for performance evaluation.

I. Preparation of Lithium-Ion Battery

1. Preparation of Anode

In accordance with the setting of each example and comparative example, graphite, an adhesive styrene butadiene rubber (SBR) and the thickening agent sodium carboxymethylcellulose (CMC) were sufficiently stirred and mixed in a proper amount of deionized water solvent according to a weight ratio of 97.4:1.2:1.4 to form a uniform anode slurry. The slurry was coated on an anode current collector (a copper foil or a nickel foil) to obtain an anode through drying, cold pressing, cutting and tab welding, and the OI value of the graphite was 3.25. A conducting layer was disposed on the surface of the anode current collector, the conducting layer included carbon nanotubes, and the tube diameter of the carbon nanotubes was 1 nm to 20 nm.

2. Preparation of Electrolyte

In an argon gas atmosphere glovebox with a moisture content <10 ppm, ethylene carbonate (EC), propylene carbonate (PC) and diethyl carbonate (DEC) were uniformly mixed according to a mass ratio of 3:3:4 to obtain a non-aqueous solvent. Then, sufficiently dried $LiPF_6$ was dissolved into the non-aqueous solvent. Finally, a certain mass of fluoroethylene carbonate was added. Other additives mentioned above may be further added to obtain a basic electrolyte. The basic electrolyte was applicable to the examples listed in Table 1 and Table 2 of the present application. The electrolyte solvent system of the examples listed in Table 3 and Table 4 have been specifically provided.

3. Preparation of Cathode

A cathode active material lithium cobalt oxide ($LiCoO_2$), a conducting agent acetylene black and an adhesive polyvinylidene fluoride (PVDF) were sufficiently stirred and mixed in a proper amount of N-methylpyrrolidone (NMP) solvent according to a weight ratio of 96:2:2 to form a uniform cathode slurry. The slurry was uniformly coated on an aluminum foil of a cathode current collector. A cathode was obtained through drying, cold pressing, cutting and tab welding.

4. Preparation of Separator

A porous polyethylene (PE) polymer film was used as a separator.

5. Preparation of Lithium-Ion Battery

The cathode, the separator and the anode were sequentially stacked, so that the separator was positioned between the cathode and the anode to achieve an isolation effect, and then were wound and put into an outer packaging foil. The electrolyte was injected. The preparation of a lithium-ion battery was completed through work procedures of vacuum encapsulation, still standing, formation, shaping and the like.

II Test Method

1. Scanning Electron Microscope (SEM) Test Method of Anode Active Material

SEM scanning was performed on a sample by using a JEOL JSM-6360LV SEM and a matched X-ray spectrometer to analyze the morphological structure and element distribution of samples.

2. Test Method of Direct Current Resistance (DCR) of Lithium-Ion Battery

The lithium-ion battery was charged to 4.2 V at a 1.5 C constant current, and was then charged to 0.05 C at a constant voltage. After still standing for 30 min, the lithium-ion battery was discharged for 10 s at a 0.1 C current (a corresponding voltage value U1 was recorded every 0.1 s), and was discharged for 360 s at a 1 C current (a corresponding voltage value U2 was recorded every 0.1 s). The charging and discharging steps were repeated 5 times. "1 C" was the current value for completely discharging the battery capacity within 1 h. The DCR of the lithium-ion battery at a 50% state of charge (SOC) was calculated according to the following formula:

$$R = (U2 - U1)/(1C - 0.1C).$$

Figure 2:
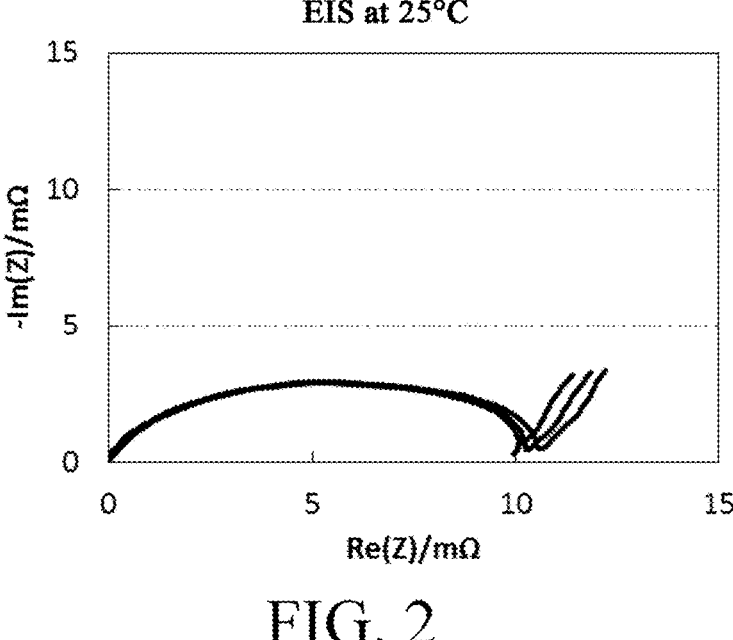
FIG. 2 shows an EIS curve according to Example 34 of the present application.

3. Test Method of Electrochemical Impedance Spectroscopy (EIS) of Lithium-Ion Battery A three-electrode lithium-ion battery was put into an electrochemical workstation, and was connected in a sequence of a work electrode and a reference electrode. A sine wave alternating current signal at an amplitude of 5 mV and a frequency of 500 KHz to 30 mHz was applied to an electrochemical system to obtain corresponding signal feedback in a frequency domain range, and an EIS curve of the lithium-ion battery was obtained. As shown in FIG. 2, the right intersection joint of a first semi-circular arc and the axis x is a charge transfer resistance value, i.e., Rct.

4. Test Method of Normal Temperature Cycle Performance of Lithium-Ion Battery

The lithium-ion battery was put into a 25° C. incubator and charged to 4.4 V at a 1.5 C constant current, charged to 0.05 C at a 4.4 V constant voltage, and then discharged to 3.0 V at a 1.0 C constant current. This was recorded as one charging and discharging cycle process. Such cycle charging and discharging test was performed 800 times in the above mode. The capacity retention rate of the lithium-ion battery was calculated through the following formula:

$$\text{Capacity retention rate} = \text{rest discharging capacity}/\text{initial charging capacity} \times 100\%$$

III. Test Results

Table 1 shows the influence of the specific surface area value $K_1$ of the unit mass of the anode active material, the content value $K_2$ of FEC and the weight value $K_3$ of the anode active material on the capacity retention rate of the lithium-ion battery. In each example and comparative example shown in Table 1, the anode active material graphite includes second particles with Dv50 being 2.5 μm and first particles with Dv50 being 22 μm, the weight ratio of the second particles to the first particles is 0.2. W:$K_1$ is 0.1, W:P is 6.5, and the thickness of the bottom coating is 1 μm.

TABLE 1

| Example/Comparative Example | $K_1 - K_2 - 1.63K_3{}^2 + 11.27K_3$ | $K_1$ | $K_2$ | $K_3$ | Capacity retention rate |
|---|---|---|---|---|---|
| Example 1 | 19 | 1.5 | 0.05 | 4.54 | 70.1% |
| Example 2 | 19 | 1.5 | 0.1 | 4.53 | 70.2% |
| Example 3 | 19 | 1.5 | 0.15 | 4.52 | 70.9% |
| Example 4 | 19 | 1.5 | 0.25 | 4.49 | 71.2% |
| Example 5 | 17 | 1.5 | 0.15 | 5.00 | 70.0% |
| Example 6 | 18 | 1.5 | 0.15 | 4.78 | 70.5% |
| Example 7 | 20 | 1.5 | 0.15 | 4.18 | 72.2% |
| Example 8 | 20.8 | 1.5 | 0.15 | 3.45 | 73.0% |
| Example 9 | 19 | 1 | 0.15 | 4.36 | 71.5% |
| Example 10 | 19 | 1.2 | 0.15 | 4.43 | 71.1% |
| Example 11 | 19 | 1.8 | 0.15 | 4.60 | 69.4% |
| Example 12 | 19 | 2 | 0.15 | 4.65 | 68.9% |
| Comparative Example 1 | 17 | 1.5 | 0.15 | 4.99 | 49.50% |
| Comparative Example 2 | 19 | 3 | 0.15 | 4.88 | 61.20% |
| Comparative Example 3 | 19 | 1.5 | 0.5 | 4.41 | 50.10% |

As shown in Table 1, Comparative Example 1 does not meet $17.55 \leq K_1 - K_2 - 1.63K_3{}^2 + 11.27K_3 \leq 20.80$, and has a poor capacity retention rate. Although Comparative Examples 2 and 3 meet $17.55 \leq K_1 - K_2 - 1.63K_3{}^2 + 11.27K_3 \leq 20.80$, $K_1$ or $K_2$ exceeds an expected range of the present application (i.e., $1.0 \leq K_1 \leq 2.0$ and $0.05 \leq K_2 \leq 0.25$), and the capacity retention rate of the lithium-ion battery is not effectively improved. Examples 1 to 12 meet $17.55 \leq K_1 - K_2 - 1.63K_3{}^2 + 11.27K_3 \leq 20.80$, $1.0 \leq K_1 \leq 2.0$, and $0.05 \leq K_2 < 0.25$, and the capacity retention rate of the lithium-ion battery is obviously improved.

As shown in Examples 1 to 4, if $K_1$ is gradually increased in a range of 1.0 to 2.0, the capacity retention rate of the lithium-ion battery is slightly increased, this is because when the relationship between $K_1$, $K_2$ and $K_3$ is fixed, $K_3$ will change along with the increase of the FEC content in the electrolyte (i.e., $K_2$). When $K_2/K_3$ stays unchanged, the change of the capacity retention rate of the lithium-ion battery is not obvious. When the FEC content in the electrolyte is too high (for example, $K_2 = 0.5$ in Comparative example 3), the solvent content corresponding to the electrolyte is reduced, and the lithium salt dissociation in the electrolyte is difficult. Meanwhile, FEC is easy to decompose, which may accelerate the formation of HF in the electrolyte, causing an increase of the acidity of the electrolyte. Moreover, HF will attack a cathode interface, which may intensify the dissolution out of transition metal and damage the battery cell performance, thus causing a capacity retention rate reduction of the lithium-ion battery.

As shown in Examples 5 to 8, when $K_1$ and $K_2$ are kept constant and $K_1 - K_2 - 1.63K_3{}^2 + 11.27K_3$ gradually increases in a range of 17.55 to 20.80, $K_3$ is gradually reduced, i.e., the FEC content corresponding to the unit anode active material is increased. FEC has strong electron-withdrawing groups, has a higher reduction potential and can form a stable passivation film on the surface of the anode prior to the solvent, so that reduction decomposition of an electrolyte solvent on the anode is inhibited, damage to the SEI film in a cycle process is relieved, and meanwhile, consumption of the electrolyte in the lithium-ion battery is reduced. Therefore, the capacity retention rate of the lithium-ion battery is obviously improved.

As shown in Examples 9 to 12, when $K_1 - K_2 - 1.63K_3{}^2 + 11.27K_3$ and $K_2$ keep constant in an expected range of the present application, along with the $K_1$ content increase, the specific surface area of the anode active material is increased, the contact with the electrolyte in the cycle process is increased, and more SEI films need to be formed. However, since $K_2$ does not increase, the damage to the SEI film in the cycle process cannot be relieved or restored, and the consumption of the electrolyte is accelerated. Therefore, the capacity retention rate of the lithium-ion battery is gradually reduced.

Table 2 shows the influence of first particles and second particles of the anode active material on DCR of the lithium-ion battery. Each example shown in Table 2 is further improved based on Example 3, that is, the differences are the only parameters in Table 2.

TABLE 2

| Example | Dv50 of second particles (μm) | Dv50 of first particles (μm) | Weight ratio of second particles to first particles | DCR (mΩ) |
|---|---|---|---|---|
| Example 13 | 8 | 16 | 1 | 58.9 |
| Example 14 | 8 | 16 | 0.2 | 56.4 |
| Example 15 | 8 | 16 | 0.9 | 51.7 |
| Example 16 | 8 | 16 | 0.5 | 55.2 |
| Example 17 | 2.5 | 16 | 0.5 | 67.8 |
| Example 18 | 4 | 16 | 0.5 | 54 |
| Example 19 | 6 | 16 | 0.5 | 54.1 |
| Example 20 | 7 | 16 | 0.5 | 55.8 |
| Example 21 | 10 | 16 | 0.5 | 56.1 |
| Example 22 | 8 | 4.5 | 0.5 | 68.5 |
| Example 23 | 8 | 6 | 0.5 | 57 |
| Example 24 | 8 | 10 | 0.5 | 56.8 |
| Example 25 | 8 | 14 | 0.5 | 56 |
| Example 26 | 8 | 18 | 0.5 | 53.1 |
| Example 27 | 15 | 16 | 0.5 | 70.2 |
| Example 28 | 8 | 22 | 0.5 | 69.7 |

As shown in Example 27, when Dv50 of the second particles of the anode active material is greater than 10 μm, DCR of the lithium-ion battery is high. As shown in Example 17, when Dv50 of the second particles of the anode active material is smaller than 3 μm, DCR of the lithium-ion battery is high. As shown in Example 22, when Dv50 of the first particles of the anode active material is smaller than 5 μm, DCR of the lithium-ion battery is high. This is because the particles of the anode active material are small, after coating, and the anode is easily pulverized, so that the transmission path of the lithium ions becomes long, thus causing a DCR increase of the lithium-ion battery. As shown in Example 28, when Dv50 of the first particles of the anode active material is greater than 20 μm, the particles of the anode active material are large, thus causing a DCR increase of the lithium-ion battery.

As shown in Examples 13 to 16, when Dv50 of the first particles and Dv50 of the second particles of the anode active material keep constant, along with the gradual reduction of the weight ratio of the second particles to the first particles in a range of 1:9 to 1:1, the relative content of the first particles is increased, and the end surface specific surface area is increased, so that the lithium ions can directly enter a graphite layer from an end surface defect position, wherein fast lithium ion migration is achieved, thereby a range of 5 μm to 20 μm, the end surface specific surface area of the anode active material is increased, the base surface specific surface area is reduced, and the path of the lithium ions entering the graphite layer becomes shorter, thus causing resistance increase and kinetic performance reduction of the lithium-ion battery.

Table 3 shows the influence of the EP content in the electrolyte on DCR and the capacity retention rate of the lithium-ion battery. Each example shown in Table 3 is improved based on Example 3, that is, the differences are only parameters in Table 3. The EC content, the PC content, the DEC content and the EP content in Table 3 are calculated based on the total weight of the solvent system.

TABLE 3

| | Solvent system (EC + PC + DEC + EP = 100%) | | | | | | | DCR | Capacity retention |
| Example | EC | PC | DEC | EP | W:K$_1$ | W | K$_1$ | (mΩ) | rate |
| --- | --- | --- | --- | --- | --- | --- | --- | --- | --- |
| Example 29 | 30 | 30 | 30 | 10 | 0.12 | 0.18 | 1.5 | 54.1 | 70.8% |
| Example 30 | 30 | 30 | 10 | 30 | 0.5 | 0.75 | 1.5 | 50.3 | 70.5% |
| Example 31 | 20 | 30 | 0 | 50 | 0.8 | 1.2 | 1.5 | 48.9 | 69.7% |
| Example 32 | 20 | 20 | 0 | 60 | 1 | 1.5 | 1.5 | 46.2 | 69.4% |
| Example 33 | 15 | 15 | 0 | 70 | 1.14 | 1.71 | 1.5 | 46.0 | 60.5% |
| Example 34 | 10 | 10 | 0 | 80 | 1.15 | 1.72 | 1.5 | 46.0 | 40.3% |
| Example 35 | 30 | 30 | 35 | 5 | 0.1 | 0.15 | 1.5 | 55.2 | 70.9% | reducing the resistance of the lithium-ion battery and improving the kinetic performance of the lithium-ion battery.

As shown in Examples 18 to 21, when Dv50 of the first particles of the anode active material and the weight ratio of the second particles to the first particles is kept constant, along with a gradual increase of Dv50 of the second particles in a range of 3 μm to 10 μm, the anode active material includes more particles with large particle sizes, so that isotropy of the graphite layer is reduced, the base surface specific surface area is increased, the end surface specific surface area is reduced, a path of the lithium ions entering the graphite layer becomes longer, and the migration of the lithium ions becomes slower, thus causing resistance increase and kinetic performance reduction of the lithium-ion battery.

As shown in Examples 23 to 26, when Dv50 of the second particles of the anode active material and the weight ratio of the second particles to the first particles is kept constant, along with gradual increase of Dv50 of the first particles in As shown in Example 34, when W:K$_1$ is greater than 1.14, the capacity retention rate of the lithium-ion battery is low. As shown in Example 35, when W:K$_1$ is smaller than 0.12, DCR of the lithium-ion battery is large.

As shown in Examples 29 to 33, along with the gradual increase of W:K$_1$ in a range of 0.12 to 1.14, DCR of the lithium-ion battery is gradually reduced, the kinetic performance is improved, but the capacity retention rate is gradually reduced. This is because the viscosity of EP per se is low, along with the EP content increase, the migration resistance of the lithium ions in the electrolyte is reduced, and concentration polarization caused by the electrolyte in charging and discharging processes is reduced, so that the kinetic performance of the lithium-ion battery is improved. However, EP easily oxidizes (its oxidization potential is much lower than that of a conventional carbonic ester solvent), and easily decomposes to produce gas in the cycle process, so that the capacity retention rate is reduced.

Table 4 shows the influence of the porosity of the anode active material on Rct and the capacity retention rate of the lithium-ion battery. Each example shown in Table 4 is improved based on Example 3, that is, the differences are the only parameters in Table 4. The EC content, the PC content, the DEC content and the EP content in Table 4 are calculated based on the total weight of the solvent system.

TABLE 4

| | Solvent system (EC + PC + DEC + EP = 100%) | | | | | | | Rct | Capacity retention |
| Example | EC | PC | DEC | EP | W:P | W | P | (mΩ) | rate |
| --- | --- | --- | --- | --- | --- | --- | --- | --- | --- |
| Example 36 | 30 | 30 | 10 | 30 | 0.5 | 0.75 | 1.5 | 24.1 | 40.2% |
| Example 37 | 30 | 30 | 10 | 30 | 0.6 | 0.75 | 1.25 | 22 | 64.8% |
| Example 38 | 30 | 30 | 10 | 30 | 1 | 0.75 | 0.75 | 22.8 | 67.0% |
| Example 39 | 30 | 30 | 10 | 30 | 2 | 0.75 | 0.36 | 23.5 | 68.1% |

TABLE 4-continued

| Example | Solvent system (EC + PC + DEC + EP = 100%) | | | | | | | Rct (mΩ) | Capacity retention rate |
|---|---|---|---|---|---|---|---|---|---|
|  | EC | PC | DEC | EP | W:P | W | P |  |  |
| Example 40 | 30 | 30 | 10 | 30 | 4 | 0.75 | 0.19 | 24.7 | 69.5% |
| Example 41 | 30 | 30 | 10 | 30 | 6 | 0.75 | 0.13 | 25.6 | 70.1% |
| Example 42 | 30 | 30 | 10 | 30 | 6.8 | 0.75 | 0.11 | 27.9 | 70.5% |

As shown in Example 36, when W:P is smaller than 0.6, the capacity retention rate of the lithium-ion battery is low. As shown in Example 42, when W:P is greater than 6.3, the electrolyte is insufficient, and graphite gaps cannot be completely infiltrated, thus causing high Rct of the lithium-ion battery.

As shown in Examples 37 to 41, along with gradual reduction of W:P in a range of 0.6 to 6.3, Rct of the lithium-ion battery is reduced, the kinetic performance is improved, but the capacity retention rate is accordingly reduced. This is because along with the reduction of W:P, the porosity of the anode active material increases, and the electrolyte capable of infiltrating the anode active material increases, so that the contact between the electrolyte and the anode active material increases, thus improving the kinetic performance of the lithium-ion battery. However, along with porosity increase of the anode active material, byproducts in the cycle process increase, and the consumption of the electrolyte increases, thus causing a reduction of the capacity retention rate.

Table 5 shows the influence of the thickness of a conducting layer on an anode current collector on DCR and the capacity retention rate of the lithium-ion battery. Each example shown in Table 5 is improved based on Example 32, that is, the differences are the only parameters in Table 5.

TABLE 5

|  | Thickness of conducting layer (μm) | DCR (mΩ) | Capacity retention rate |
|---|---|---|---|
| Example 32 | 1 | 46.2 | 69.40% |
| Example 43 | 0.4 | 60.4 | 58.40% |
| Example 44 | 0.5 | 53.4 | 72.80% |
| Example 45 | 0.8 | 49.7 | 71.90% |
| Example 46 | 1.5 | 44.5 | 69.30% |
| Example 47 | 1.6 | 40.8 | 55.70% |
| Example 48 | 0 | 57.3 | 60.30% |

Example 48 has the same preparation method as Example 32 with the difference that no conducting layer is disposed on the anode current collector.

It can be known from Examples 43 to 48 that when the thickness of the conducting layer on the anode current collector is in a range of 0.5 μm to 1.5 μm, an electron conduction effect can be achieved, and meanwhile, adhesion between the anode active material layer and the anode current collector can be increased, so that peeling of the anode active material layer is reduced in the cycle process. DCR reduction and kinetic performance improvements are shown.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appearing throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrochemical device, comprising: a cathode, an anode and an electrolyte; wherein the anode comprises an anode current collector and an anode active material layer disposed on the anode current collector, and the anode active material layer comprises an anode active material;

the electrolyte comprises fluoroethylene carbonate; and the electrochemical device meets the following relationship:

$$17.55 \le K_1 - K_2 - 1.63K_3^2 + 11.27K_3 \le 20.80,$$

wherein $K_1$ is a specific surface area value of a unit mass of the anode active material in $m^2/g$;

$K_2$ is a ratio of a content value (g) of the fluoroethylene carbonate to a capacity (Ah) of the electrochemical device, and $0.015 \le K_2 \le 0.36$; and $K_3$ is a ratio of a weight value (g) of the anode active material to a capacity (Ah) of the electrochemical device.

2. The electrochemical device according to claim 1, wherein the anode active material comprises first particles, the first particles are secondary particles, and a quantity of the secondary particles is 50% to 95% of a total quantity of particles of the anode active material.

3. The electrochemical device according to claim 2, wherein the quantity of the secondary particles is 60% to 90% of the total quantity of particles of the anode active material.

4. The electrochemical device according to claim 2, wherein a Dv50 of primary particles in the secondary particles is 2 μm to 10 μm, and a Dv50 of the secondary particles is 5 μm to 20 μm.

5. The electrochemical device according to claim 4, wherein the Dv50 of the secondary particles is 8 μm to 18 μm.

6. The electrochemical device according to claim 1, wherein the anode active material comprises second particles, the second particles are primary particles, and a Dv50 of the second particles is 3 μm to 10 μm.

7. The electrochemical device according to claim 6, wherein the Dv50 of the second particles is 5 μm to 8 μm.

8. The electrochemical device according to claim 1, wherein a Dv50 of the anode active material is 9 μm to 25 μm.

9. The electrochemical device according to claim 8, wherein the Dv50 of the anode active material is 10 μm to 20 μm.

10. The electrochemical device according to claim 1, wherein a porosity of the anode active material layer is 15% to 40%.

11. The electrochemical device according to claim 1, wherein a porosity of the anode active material layer is 20% to 35%.

12. The electrochemical device according to claim 1, wherein the anode further comprises a conducting layer, and a thickness of the conducting layer is 0.5 μm to 1.5 μm.

13. The electrochemical device according to claim 12, wherein a thickness of the conducting layer is 0.8 μm to 1.2 μm.

14. The electrochemical device according to claim 1, wherein the electrolyte further comprises an organic solvent, and the organic solvent comprises ethyl propionate.

15. The electrochemical device according to claim 14, wherein the content of the ethyl propionate is 5% to 80% of the total weight of the organic solvent.

16. The electrochemical device according to claim 15, wherein the organic solvent further includes at least one of ethylene carbonate (EC), propylene carbonate (PC), butylene carbonate, dimethyl carbonate, ethyl methyl carbonate, diethyl carbonate (DEC), methyl n-propyl carbonate, ethyl n-propyl carbonate, di-n-propyl carbonate, di(fluoromethyl) carbonate, di(difluoromethyl) carbonate, di(trifluoromethyl) carbonate, bis(2-fluoroethyl) carbonate, bis(2,2-difluoro-ethyl) carbonate, bis(2,2,2-trifluoroethyl) carbonate, methyl 2-fluoroethyl carbonate, methyl 2,2-difluoroethyl carbonate, methyl 2,2,2-trifluoroethyl carbonate, methyl acetate, ethyl acetate, propyl acetate, isopropyl acetate, butyl acetate, sec-butyl acetate, isobutyl acetate, tert-butyl acetate, methyl propionate, propyl propionate, isopropyl propionate, methyl butyrate, ethyl butyrate, propyl butyrate, methyl isobutyrate, ethyl isobutyrate, methyl valerate, ethyl valerate, methyl trifluoroacetate, ethyl trifluoroacetate, propyl trifluoroac-etate, butyl trifluoroacetate, 2,2,2-trifluoroethyl trifluoroac-etate, γ-butyrolactone or γ-valerolactone.

17. The electrochemical device according to claim 14, wherein $0.12 \leq W:K_1 \leq 1.14$, W is a ratio of a content value (g) of the ethyl propionate to a capacity (Ah) of the electro-chemical device.

18. The electrochemical device according to claim 17, wherein $0.3 \leq W:K_1 \leq 1.0$.

19. The electrochemical device according to claim 14, wherein $0.6 \leq W:P \leq 6.3$, W is a ratio of a content value (g) of the ethyl propionate to a capacity (Ah) of the electrochemi-cal device, P is a porosity value of the anode active material layer (in percentage).

20. The electrochemical device according to claim 19, wherein $1.0 \leq W:P \leq 5$.

* * * * *